US007274496B2

(12) United States Patent
Sakakibara et al.

(10) Patent No.: US 7,274,496 B2
(45) Date of Patent: Sep. 25, 2007

(54) 4-LINE CCD SENSOR AND IMAGE INPUT APPARATUS USING THE SAME

(75) Inventors: Jun Sakakibara, Tokyo (JP); Koji Tanimoto, Tagata-gun (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 905 days.

(21) Appl. No.: 10/377,818

(22) Filed: Mar. 4, 2003

(65) Prior Publication Data

US 2004/0174447 A1    Sep. 9, 2004

(51) Int. Cl.
*H04N 1/46* (2006.01)
*H04N 1/04* (2006.01)

(52) U.S. Cl. .................. 358/514; 358/512; 358/515; 358/474

(58) Field of Classification Search ................ 358/514, 358/512, 515, 474, 486; 250/208.1; 399/211; 382/270
See application file for complete search history.

(56) References Cited

U.S. PATENT DOCUMENTS

| 5,773,814 A * | 6/1998 | Phillips et al. ............ 250/208.1 |
| 6,831,761 B2 * | 12/2004 | Cardot et al. ................ 358/505 |
| 2003/0053157 A1 * | 3/2003 | Sakakibara et al. ......... 358/514 |

FOREIGN PATENT DOCUMENTS

| JP | 2-76361 A | 3/1990 |
| JP | 11-220589 A | 8/1999 |
| JP | 2000-69254 A | 3/2000 |
| JP | 2000-125084 A | 4/2000 |
| JP | 2001-119535 A | 4/2001 |
| JP | 2001-217995 A | 8/2001 |

OTHER PUBLICATIONS

U.S. Appl. No. 09/955,090, filed Sep. 19, 2001, Jun Sakakibara et al.

* cited by examiner

*Primary Examiner*—Jerome Grant
*Assistant Examiner*—Houshang Safaipour
(74) *Attorney, Agent, or Firm*—Foley & Lardner LLP

(57) ABSTRACT

A 4-line CCD sensor according to one embodiment of the present invention has a monochromic reading line sensor section and a color reading line sensor section. This 4-line CCD sensor is characterized in that amplification factors for amplifiers 1 to 4 are set so that the amplitude of an output signal from the monochromic reading line sensor section is the same as that of each output signal from the color reading line sensor section. This 4-line CCD sensor is characterized in that the amplification factors for the amplifiers 1 to 4 are set so that the amplitude of each output signal from the color reading line sensor section is smaller than that of an output signal from the monochromic reading line sensor section.

3 Claims, 5 Drawing Sheets

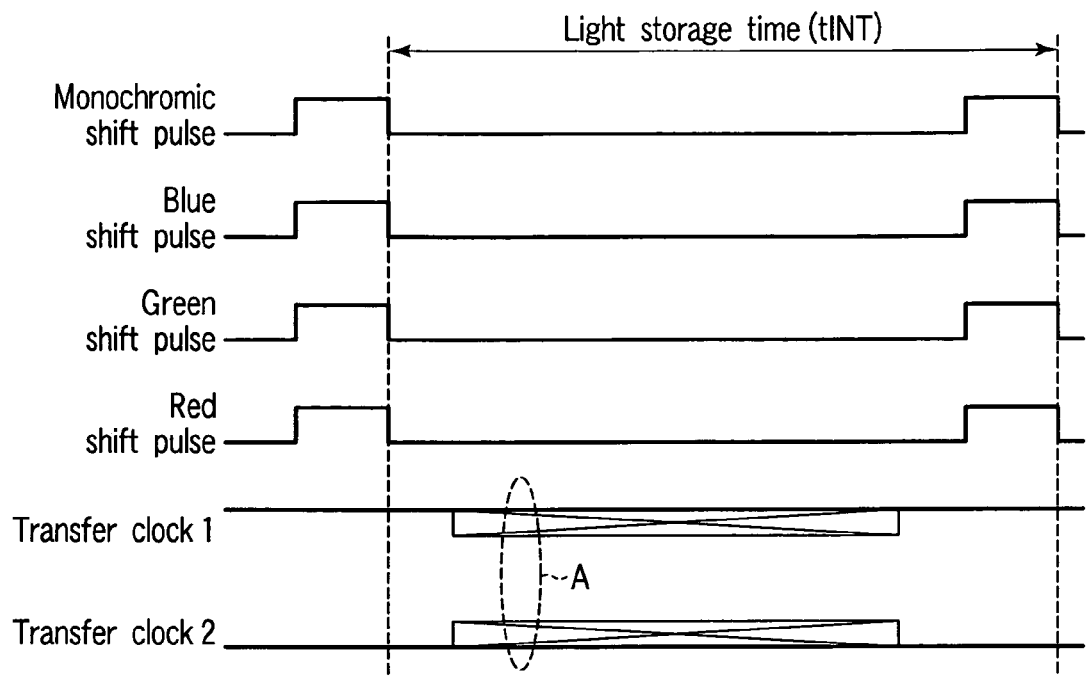
F I G. 4A
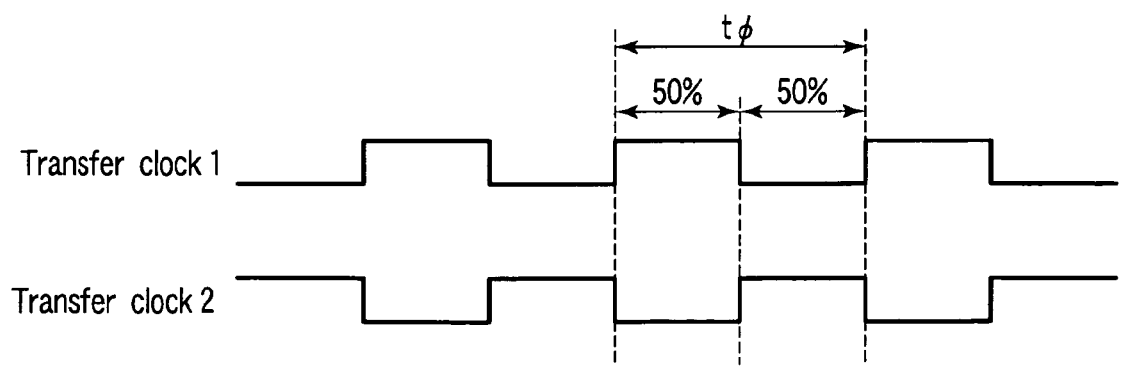
F I G. 4B

4-LINE CCD SENSOR AND IMAGE INPUT APPARATUS USING THE SAME

BACKGROUND OF THE INVENTION

Today, 4-line CCD sensors are commercially available and are commonly used. The 4-line CCD sensor comprise a monochromic reading sensor in which no color filters are arranged on a light receiving surface of a photodiode array in order to read monochromic originals, and a color reading 3-line sensor in which color filters for red, green, and blue (hereinafter referred to as R, G, and B), i.e. the three primary colors, are arranged on the light receiving surfaces of the respective photodiode arrays composed of the same material, in order to read a color original, the monochromic reading line sensor and the color reading 3-line sensor being constituted by the same chip.

The structure of the CCD line sensor is disclosed in Jpn. Pat. Appln. KOKAI Publication No. 2-76361. Driving of the CCD sensor is disclosed in Jpn. Pat. Appln. KOKAI Publication Nos. 11-220569 and 2000-69254.

In this case, sensitivity, an electric characteristic of the CCD line sensor is defined by output power [V/lx. sec] with respect to the quantity of incident light per unit time. Thus, with a 4-line CCD sensor composed of a plurality of CCD sensors, even if the CCD sensors, i.e. the photodiode arrays are irradiated with uniform light energy, i.e. the same quantity of light over the same period, the amplitudes of output signals from the CCD sensors vary according to the transmittal wavelength through the color filters arranged on the light receiving surfaces.

In view of these points, an image input apparatus according to the prior art matches the amplitudes of output signals from the CCD sensors to one another by adjusting the spectral characteristic of a light source according to the sensitivities of a plurality of CCD sensors. Further, if the output signals from the CCD sensors have different amplitudes, the amplitudes of the output signals are matched to one another by adjusting, according to the amplitudes of the output signals, the amplification factor of an amplifier succeeding the CCC sensors, e.g. a gain amplifier composed of an operational amplifier or the like.

On the other hand, with a scanner section as an image input apparatus used for recent color readable digital copiers and digital composite machines, the succeeding circuit carries out adjustment even with the use of a light source having its spectral characteristics limited to some degree.

BRIEF SUMMARY OF THE INVENTION

The present invention is provided in view of the above problems. It is an object of the present invention to provide a 4-line CCD sensor that realizes appropriate gradation merely by easy adjustment or without any adjustment using a simple circuit configuration, as well as an image input apparatus that can use a simple and inexpensive circuit configuration to realize application-based image inputs, e.g. high-speed color reading for low gradation and low-speed color reading for high gradation.

To accomplish the above object, the 4-line CCD sensor or image input apparatus according to an embodiment of the present invention has a monochromic reading line sensor section composed of a monochromic photodiode array which receives incident light from a light source which emits a large quantity of white light, to carry out photoelectric conversion according to the quantity of incident light, a monochromic shift gate which transfers charges from the monochromic photodiode array, a monochromic analog shift register which receives the charges from the monochromic shift gate to transfer an electric signal, and a monochromic amplifier which has an amplification factor set according to a spectral characteristic of the light source and amplifies an electric signal from the monochromic analog shift register with this amplification factor to output the amplified electric signal to an exterior, and a color reading line sensor section composed of color photodiode arrays each of which receives incident light from the light source to carry out photoelectric conversion according to the quantity of the incident light, color shift gates each of which transfers charges from the color photodiode array, a color analog shift register which receives the charges from the color shift gate to transfer an electric signal, and color amplifiers each of which has an amplification factor set according to the spectral characteristic of the light source and amplifies an electric signal from the color analog shift register with this amplification factor to output the amplified electric signal to the exterior.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

FIGS. 4A and 4B are timing charts showing driving timings for each line of the 4-line CCD sensor on which a first and second embodiments of the present invention are based;

DETAILED DESCRIPTION OF THE INVENTION

Embodiments of the present invention will be described with reference to the drawings.

Figure 1:
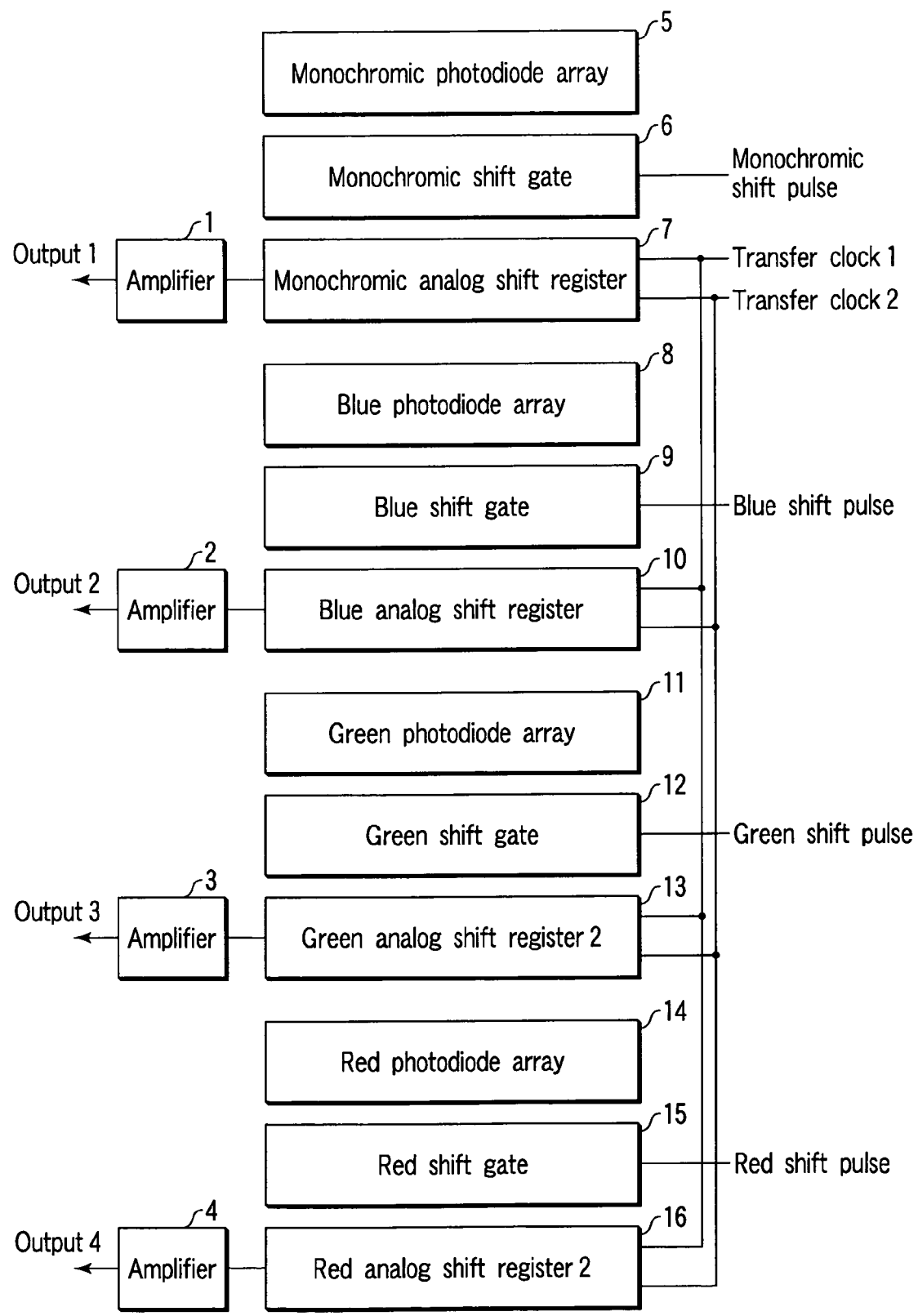
FIG. 1 is a conceptual diagram showing an example of configuration of a 4-line CCD sensor on which a first and second embodiments of the present invention are based.

FIG. 1 schematically shows an example of configuration of a 4-line CCD sensor on which a first and second embodiments of the present invention are based. This 4-line CCD sensor will be described in detail.

As shown in FIG. 1, this 4-line CCD sensor is composed of a monochromic reading line sensor section and a color image reading 3-line sensor section (specifically, the color image reading 3-line sensor section is composed of a blue reading line sensor section, a green reading line sensor section, and a red reading line sensor section).

First, the monochromic reading line sensor section is composed of a monochromic photodiode array 5, a monochromic shift gate 6, a monochromic analog shift register 7, and an amplifier 1. No color shifters are arranged on a light receiving surface of the monochromic photodiode array 5. With this configuration, upon receiving a monochromic shift pulse, the monochromic shift gate 6 transfers charges photoelectrically converted by the monochromic photodiode array 5 according to the quantity of incident light, to the succeeding monochromic analog shift register 7. Upon receiving transfer clocks 1 and 2, the monochromic analog shift register 7 sequentially transfers charges photoelectrically converted by the monochromic photodiode array and obtained via the monochromic shift gate 6. The amplifier 1 outputs an output signal from the monochromic analog shift register 7 to an exterior.

Further, the blue reading line sensor section is composed of a blue photodiode array 8, a blue shift gate 9, a blue analog shift register 10, and an amplifier 2. A blue color filter is arranged on a light receiving surface of the blue photodiode array 8. With this configuration, upon receiving a blue shift pulse, the blue shift gate 9 transfers charges photoelectrically converted by the blue photodiode array 8 according to the quantity of incident light, to the succeeding blue analog shift register 10. Upon receiving transfer clocks 1 and 2, the blue analog shift register 10 sequentially transfers the charges photoelectrically converted by the blue photodiode array 8 and obtained via the blue shift gate 9. The amplifier 2 outputs an output signal from the blue analog shift register 10 to the exterior.

The green reading line sensor section is composed of a green photodiode array 11, a green shift gate 12, a green analog shift register 13, and an amplifier 3. A green color filter is arranged on a light receiving surface of the green photodiode array 11. With this configuration, upon receiving a green shift pulse, the green shift gate 12 transfers charges photoelectrically converted by the green photodiode array 11 according to the quantity of incident light, to the succeeding green analog shift register 13. Upon receiving transfer clocks 1 and 2, the green analog shift register 13 sequentially transfers the charges photoelectrically converted by the green photodiode array 11 and obtained via the green shift gate 12. The amplifier 3 outputs an output signal from the green analog shift register 13 to the exterior.

Furthermore, the red reading line sensor section is composed of a red photodiode array 14, a red shift gate 15, a red analog shift register 16, and an amplifier 4. A red color filter is arranged on a light receiving surface of the red photodiode array 14. With this configuration, upon receiving a red shift pulse, the red shift gate 15 transfers charges photo-electrically converted by the red photodiode array 14 according to the quantity of incident light, to the succeeding red analog shift register 16. Upon receiving transfer clocks 1 and 2, the red analog shift register 16 sequentially transfers the charges photoelectrically converted by the red photodiode array 14 and obtained via the red shift gate 15. The amplifier 4 outputs an output signal from the red analog shift register 16 to the exterior.

Figure 2A:
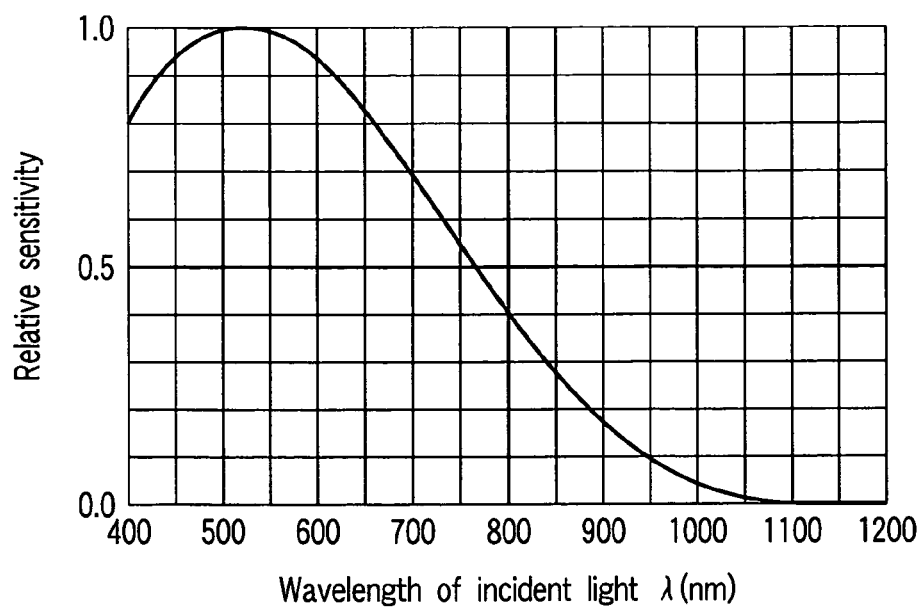
FIG. 2A is a graph showing the spectral sensitivity characteristic of a monochromic reading line sensor section in the 4-line CCD sensor.
Figure 2B:
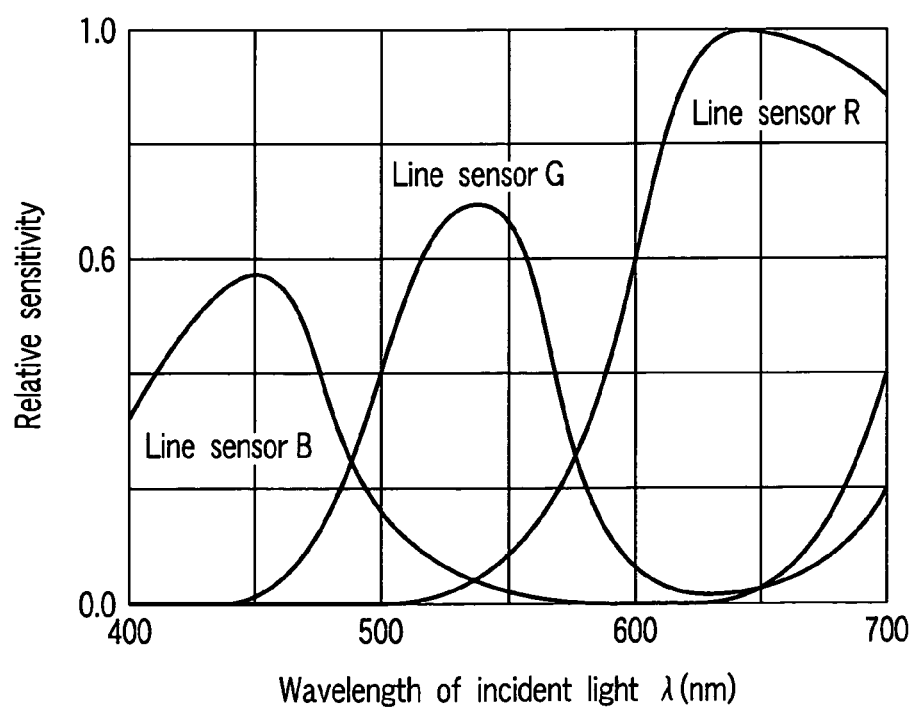
FIG. 2B is a graph showing the spectral sensitivity characteristic of a color reading line sensor section in the 4-line CCD sensor.

FIG. 2A shows the spectral sensitivity characteristic of the monochromic photodiode array 5, which has no color filters arranged on its light receiving surface. FIG. 2B shows the spectral sensitivity characteristic of the color reading 3-line sensor section, which has the red, green, and blue color filters arranged on the light receiving surfaces. Each line sensor of the 4-line CCD sensor already shown in FIG. 1 has the spectral sensitivity characteristic shown in FIG. 2B. The spectral sensitivity characteristic is determined by a photoconductive material used as well as production conditions. In these figures, the axis of abscissa indicates an incidence wavelength λ (nm). The axis of ordinate indicates a signal current resulting from light energy incident on a scanning surface, in terms of relative sensitivity (%). As shown in FIGS. 2A and 2B, an incident light wavelength related to the peak of the relative sensitivity varies among BK, R, G, and B. In the figures, the maximum value of red is defined to have a relative value (relative sensitivity) of 1, with the other colors relatively defined.

Figure 3:
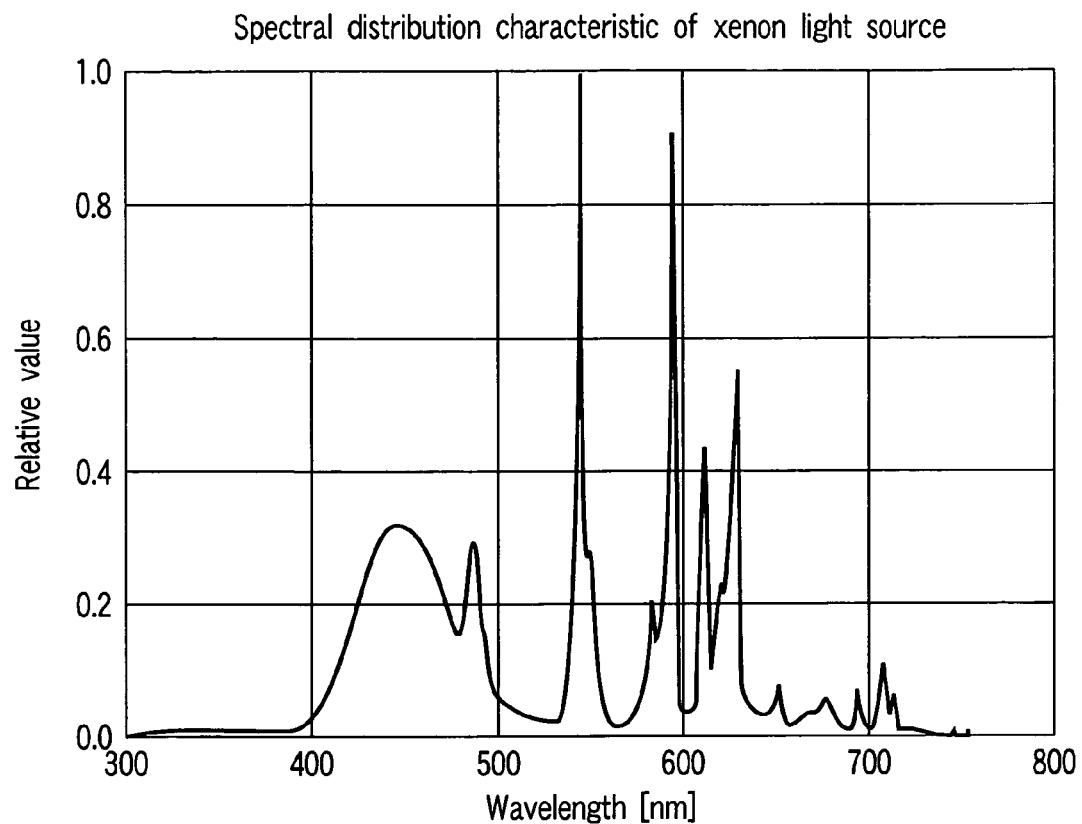
FIG. 3 is a graph showing the spectral distribution characteristic of a white xenon light source.

FIG. 3 shows the spectral characteristic of a white xenon light source as an example of a light source.

In the example of FIG. 3, the axis of abscissa indicates wavelength (nm), while the axis of ordinate indicates a relative value (%). Today, a xenon light source is commonly used because it is characterized by emitting a continuous spectrum approximate to daylight and providing high luminance. A white fluorescent lamp provides a large quantity of light, and a halogen light source generates less heat.

Figure 5:
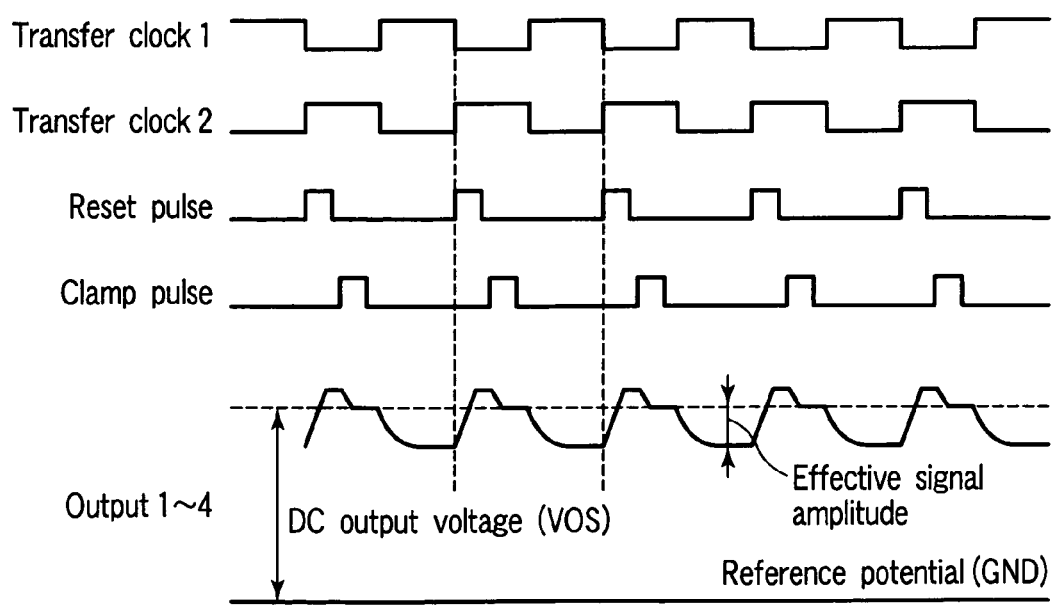
FIG. 5 is a timing chart showing driving timings for each pixel of the 4-line CCD sensor on which a first and second embodiments of the present invention are based.

FIGS. 4A and 4B show an example of driving timings for each line of the 4-line CCD sensor. FIG. 5 shows an example of driving timings for each pixel of the 4-line CCD sensor. Specific operations will be described below. Specific operations of the image input apparatus will be described later.

First, with reference to FIGS. 4A and 4B, description will be given of example of driving timings for each line of the 4-line CCD sensor.

Light emitted by a white xenon light source having such a spectral characteristic as shown in FIG. 3 is reflected by a surface of an original and then impinges against the light receiving surfaces of the photodiode arrays 5, 8, 11, and 14 of the 4-line CCD sensor.

The monochromic shift pulse is a control signal for the monochromic shift gate. When the monochromic shift pulse is at an "H" level, charges photo-electrically converted by the monochromic photodiode array 5 are transferred to the monochromic analog shift register 7 via the monochromic shift gate 6. Then, the charges transferred to the monochromic analog shift register 7 are sequentially transferred in an output direction according to transfer clocks 1 and 2. The charges are then output to the exterior via the amplifier 1 in an output stage.

With the color reading 3-line CCD sensor, when the blue shift pulse, the green shift pulse, and the red shift pulse are at the "H" level, charges are transferred to the blue analog shift register 10, the green analog shift register 13, and the red analog shift register 16, respectively, via the blue shift gate 9, the green shift gate 12, and the red shift gate 15, respectively. Then, the charges are sequentially transferred in the output direction according to the transfer clocks 1 and 2. The charges are then output from the blue analog shift register 10 via the amplifier 2 in the final output stage, from the green analog shift register 13 via the amplifier 3 in the final output stage, and from the red analog shift register 16 via the amplifier 4 in the final output stage, respectively.

In this example, the phases of the transfer clocks 1 and 2 are displaced from each other by 180° and each have a duty ratio (the ratio of the "H" level and a "L" level) set at 50%.

Now, with reference to FIG. 5, a detailed description will be given of an example of driving timings for each pixel of the 4-line CCD sensor.

As shown in FIG. 5, in this example, a reset pulse and a clamp pulse, shown in the figure, are inputted with the same period as that of the transfer clocks 1 and 2.

Charges outputted by the analog shift registers 7, 10, 13, and 16 are transferred to a floating capacitor section in the final stage (not shown).

The floating capacitor section normally has a certain fixed potential. When charges are outputted by the analog shift register 7, 10, 13, or 16, the potential at the floating capacitor varies. Furthermore, in this example, once the charges have been completely transferred, the reset pulse is inputted to perform an operation of returning the potential at the floating capacitor to a reference potential. This is because if this operation is not performed, the charges outputted by the analog shift registers 7, 10, 13, and 16 are gradually accumulated, which hinders the signal from being cut up into pixels.

A signal is essentially outputted by the CCD sensor when the transfer clocks 1 and 2 and the reset pulse are inputted to the registers.

This will be described using the output waveform in the lowest stage.

The reference potential at the floating capacitor section appears like a DC output voltage (VOS), i.e. an offset component from the reference potential (GND=0 V), as viewed from an output signal. The reset pulse causes a reset noise to be superimposed on the DC output voltage (VOS). The superimposed section is followed by a stable section called a "field through". Subsequently, charges are outputted by the analog shift register at a rising edge of the transfer clock 2. As shown in the figure, a signal is outputted downward from the DC output voltage. In this case, a phenomenon occurs in which the potential at the floating capacitor section is unstably fluctuated by operations of a reset gate (not shown) controlled by a reset pulse. It is known that this fluctuation is also superimposed on an effective signal part. To prevent this phenomenon, the reset pulse is inputted after the reset pulse to stabilize the potential at the field through section. This serves to reduce the fluctuation of the effective signal part. The 4-line CCD sensor has different effective signal amplitudes for the respective channels in order to perform the above operation.

(First Embodiment)

On the basis of the above preconditions, a detailed description will be given of a 4-line CCD sensor according to a first embodiment of the present invention. The 4-line CCD sensor according to the first embodiment is characterized in that the light source used is limited to a white xenon light source and in that the amplification factor of an output amplifier section in each output stage is determined.

The general configuration of the 4-line CCD sensor on which the first embodiment of the present invention is based is similar to that shown in FIG. 2. Its description is thus omitted.

In the 4-line CCD sensor according to the first embodiment, predetermined amplification factors (GAIN: A, B, C, and D) are set for the amplifiers 1, 2, 3, and 4, provided in the output stages of the analog shift register sections 7, 10, 13, and 16.

The blue, green, and red color filters arranged on the light receiving surfaces of the photodiode array sections 8, 11, and 14 each have such a relative transmittance as shown in FIG. 2B. As is apparent from this figure, the 4-line CCD sensor has the photodiode arrays 8, 11, and 14 with the color filters arranged on their light receiving surfaces and the photodiode array 5 with no color filters arranged on its light receiving surface. Furthermore, as shown in FIG. 3, the spectral characteristic of the white xenon light source does not exhibit a uniform wavelength distribution. Accordingly, the amounts of charges outputted by the analog shift registers 7, 10, 13, and 16 are not equal.

That is, when the amount of charges outputted by the monochromic analog shift register 7 is assumed to be 1.0, the amounts of charges outputted by the registers are as shown below.

| | |
|---|---|
| Monochromic analog shift register output: | 1.0 |
| Blue analog shift register output: | 0.5 |
| Green analog shift register output: | 0.6 |
| Red analog shift register output: | 0.8 |

Then, when a white xenon light source is used to read an original, these values must be equal. Consequently, the amplification factors of the amplifiers 1 to 4, shown in FIG. 1, may be set as shown below.

GAIN A: multiplied by 1.00 (1.0×1.00)
GAIN B: multiplied by 2.00 (0.5×2.00)
GAIN C: multiplied by 1.67 (0.6×1.67)
GAIN D: multiplied by 1.25 (0.8×1.25)

When these amplification factors are set for the amplifiers 1 to 4, respectively, if a white xenon light source is used, the effective output amplitudes of output signals equal one another. Therefore, according to the first embodiment of the present embodiment provides a 4-line CCD sensor characterized in that the internal amplification factors are matched to one another on the basis of the white xenon light source.

Now, description will be given of an improved example of the 4-line CCD sensor according to the first embodiment of the present invention. In the first embodiment, all output signal amplitudes are intentionally matched to one another. However, in this improved example, attention is paid to advantages of an intentional variation in output signal amplitude.

Now, the amount of charges outputted by the monochromic analog shift register is assumed to be 1.0. Then the amounts of charges outputted by the registers are as shown below.

| | |
|---|---|
| Output from the monochromic analog shift register: | 1.0 |
| Output from the blue analog shift register: | 0.5 |
| Output from the green analog shift register: | 0.6 |
| Output from the red analog shift register: | 0.8 |

In this improved example, when a white xenon light source is used to read a white original, the balance of these values is intentionally changed. That is, the amplification factors of the amplifiers 1 to 4 are as shown below.

GAIN A: multiplied by 1.00 (1.0×1.00)=X
GAIN B: multiplied by 1.00 (0.5×1.00)=X×½
GAIN C: multiplied by 0.83 (0.6×1.83)=X×½
GAIN D: multiplied by 0.62 (0.8×0.62)=X×½

These settings make the amplitude value of color signals half of the amplitude value of a monochromic output signal.

That is, according to this improved example, the amount of charges stored in each photodiode array can be limited by setting a light storage time tINT (see FIG. 4A) required to read a colored original to be double a light storage time tINT required to read a monochromic original. Further, the output signal amplitudes can be matched to one another by setting the amplification factors of the amplifiers in the final stages. Further, the succeeding circuit can be easily configured by integrally multiplying the speed ratio.

(Second Embodiment)

Figure 6:
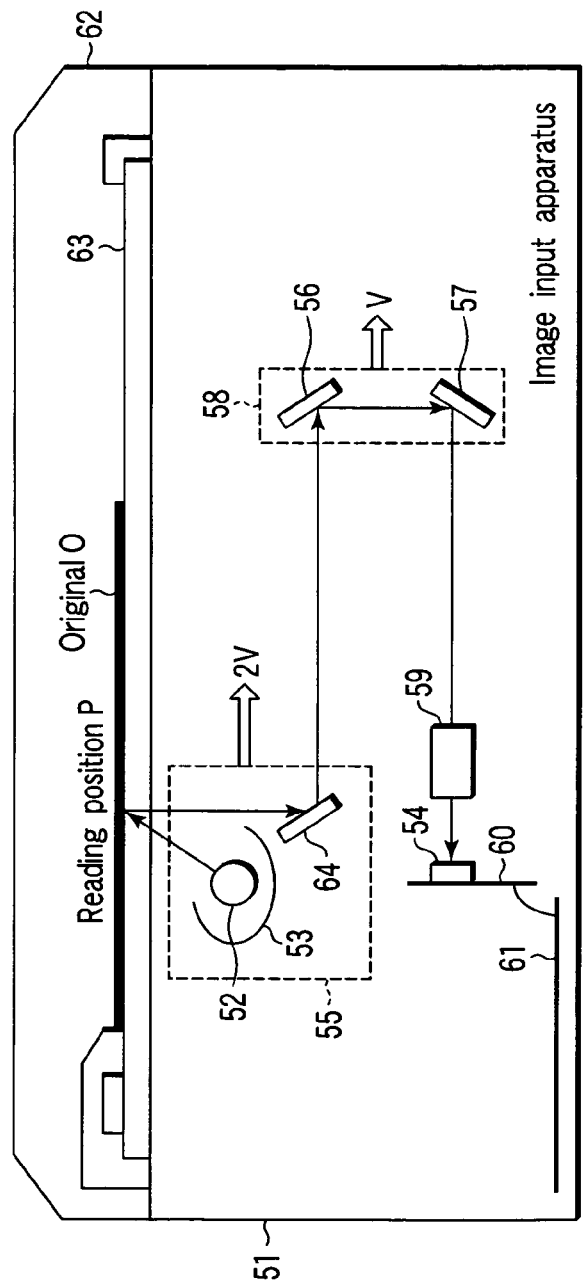
FIG. 6 is a conceptual drawing showing an example of configuration of an image input apparatus using the 4-line CCD sensor according to the second embodiment of the present invention.

FIG. 6 shows a configuration of an image input apparatus employing a 4-line CCD sensor according to a second embodiment of the present invention. In the present embodiment, a 4-line CCD sensor 54 is, for example, the one shown in FIG. 1. Furthermore, in the present embodiment, the spectral characteristic of a light source must be specified. Accordingly, a white xenon light source having the spectral characteristic in FIG. 3 is employed as a light source 52. However, of course, the light source 52 may be a fluorescent lamp, a halogen lamp, or the like.

As shown in FIG. 6, a first mirror 64, a second mirror 56, a third mirror 57, and a condensing lens 59 are disposed in an optical path for light reflected by an original O at its reading position P, the light being emitted by the light source 52, covered with a reflector 53. The 4-line CCD sensor 54 is disposed on an optical axis of the condensing lens 59. The 4-line CCD sensor 54 is disposed on a CCD substrate 60. The CCD substrate 60 is electrically connected to a CCD control substrate 61. The light source 52, the reflector 53, and the first mirror 64 are disposed in a second carriage 58.

Copy glass plate 63 on which an original is placed is located over the image input apparatus 51. An original fixing cover 62 is disposed over the copy glass plate 63. The 4-line CCD sensor 10 and a sensor driving circuit (not shown) are mounted on the CCD substrate 60. The CCD control substrate 61 is provided with a control circuit composed of a CPU or the like to control the 4-line CCD sensor 54 and an image processing circuit (not shown) that processes an output signal from the 4-line CCD sensor 54.

With such a configuration, the original O is placed on the copy glass plate 63. The original fixing cover 62 is then used to contact the original O with the copy glass plate 63 for fixation.

Then, the image input apparatus 51, for example, turns on the light source 52 to irradiate the original O with light. Light reflected by the original O at the reading point P passes through the copy glass plate 63 and is then reflected by the first mirror 64, the second mirror 56, and the third mirror 57 in this order. The reflected light is formed into an image on the light receiving surface of the 4-line CCD sensor 54 via the condensing lens 59. Then, the 4-line CCD sensor 54 converts the light reflected by the original O and then formed into the image on the light receiving surface of the 4-line CCD sensor 54, from optical energy into an electric signal. Furthermore, the signal processing circuit section (not shown) on the succeeding CCD control circuit 61 executes various processes.

A first carriage 55 and a second carriage 58 move at speeds 2V and V, respectively, in the direction shown in the figure. Accordingly, the reading position P on the original also moves. Thus, an optical path length, i.e. the distance from the reading position P to the 4-line CCD sensor 54, is kept fixed.

Figure 7:
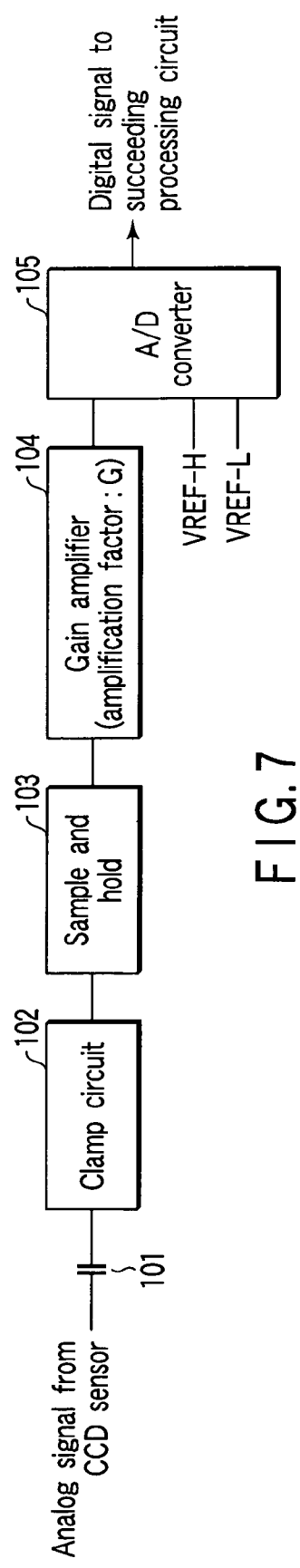
FIG. 7 is a block diagram of an analog signal processing circuit employed in the image input apparatus according to the second embodiment of the present invention to process CCD output signals.

FIG. 7 shows the detailed configuration of the CCD control circuit 12.

An analog signal from the 4-line CCD sensor 54 is inputted to the CCD control circuit 61. This signal contains a DC output voltage (VOS). This DC component is not required for the succeeding process. Thus, a coupling capacitor 101 is inserted between the 4-line CCD sensor 54 and the succeeding circuit to remove the DC output voltage, i.e. the DC component. The signal free from the DC component is provided with an offset suitable for the succeeding process.

Subsequently, an effective signal part is stabilized by a sample and hold circuit 103. The amplitude of the effective signal part is then adjusted by a gain amplifier circuit 104 composed of an operational amplifier so as to conform to the input range of the succeeding A/D converter 105 that converts an analog signal into a digital signal. Then, the A/D converter 105 converts the effective signal part into a digital signal. The upper limit of input range of the A/D converter 105 is set using a reference voltage VERF-H, while its lower limit is set using a reference voltage VREF-L. Thus, the signal processed by the gain amplifier circuit 104 has a signal amplitude between the reference voltage VREF-L and the reference voltage VREF-H. Subsequently, the signal is converted so as to have a required resolution, and the converted signal is then subjected to various processes by the succeeding digital signal processing system (not shown). In the example in FIG. 7, the resolution is 10 bits, but of course the present invention is not limited to this aspect.

Thus, the A/D converter 105 provides a digital signal ranging from the lower limit VREF-L of the reference voltage and the result of conversion "000H" of this potential to the upper limit VREF-H of the reference voltage and the result of conversion "3FFH" of this voltage. The processing system from the coupling capacitor 102 to the A/D converter 105 is required for each color. There are thus four processing systems for monochromic signal processing, blue signal processing, green signal processing, and red signal processing.

In the second embodiment, all sensitivities of the 4-line CCD sensor 54, shown in FIG. 6, have the same amplitude if the white xenon light source 52 is used to read a white original. Thus, the amplification factors of the gain amplifier circuits 104 in the four systems can be taken as having the same value. This serves to simplify the circuit and reduce its costs.

Further, it is assumed that the sensitivities of the 4-line CCD sensor 54, shown in FIG. 6, are set so that if the white xenon light source 52 is used to read a white original, the signal amplitude of each color, i.e. blue, green, or red is half that of black and white. Then, the output amplitudes are made equal by reading monochromic originals at high speed and doubling the light storage time (tINT) for reading of colored originals compared to reading of monochromic originals. In this case, the periods of the transfer clocks 1 and 2 and reset and clamp pulses, which control operations for each pixel, are doubled, i.e. their frequencies are reduced to half compared to monochromic originals. Consequently, analog signals with a good S/N can be obtained. Thus, in this case, when a colored original is read, a signal with a good S/N and gradation can be obtained.

In the above description, the ratio of an output from the amplifier 20, i.e. a monochromic output signal, to an output from the amplifier 21, i.e. a blue output signal, to an output from the amplifier 22, i.e. a green output signal, to an output from the amplifier 23, i.e. a red output signal is 2:1:1:1. Similar advantages are obtained by setting this ratio at the integral power of 2 such as in 4:1:1:1 (n:1:1:1, n=2, 4, 8, . . . ).

Further, the blue photodiode array 27, green photodiode array 30, and red photodiode array 33, which are used to read a colored image, are physically spaced from one another. That is, strictly speaking, the position at which the original O is read varies. Accordingly, the succeeding digital signal processing section must execute such a process that image signals for the respective colors correspond to the same position. This process can be easily organized by setting the signal amplitude of an output from the amplifier 20 to be larger than the signal amplitudes of outputs from the amplifiers 21 to 23 by a factor of integral power of 2 and setting the ratio of the monochromic reading speed to the color reading speed to be the integral power of 2.

Another example will be given in which the sensitivities of the 4-line CCD sensor 54, shown in FIG. 6, are set so that if the white xenon light source 52 is used to read a white original (original O) using a light storage time with the same period, then the signal amplitude of each color, i.e. blue, green, or red is half that of black and white. In this example, the amplitude of each of the blue, green, and red outputs is half that of the monochromic output. In this case, the process can be adjusted by setting the amplification factor of the gain amplifier circuits 104 to be double that of the gain amplifier 104 for the monochromic system. However, a fixed amount of noise component is contained in each output signal from the CCD sensor, so that the amount of charges decreases after photoelectric conversion. Consequently, the S/N decreases to provide image signals with a large amount of noise. However, if a colored image is inputted for filing, which does not require gradation, then it can be read at a reading speed equivalent to the one at which monochromic images are read.

Further, for photographic images or the like, which require gradation, a colored image with a good S/N can be obtained by doubling the light storage time (tINT) and reducing the reading speed to half compared to monochromic images when a colored original is read.

As described above, the above embodiments of the present invention provide a 4-line CCD sensor with its amplification factors set so that the amplitudes of output signals from the line sensors are matched to one another according to the spectral characteristic of the light source used, as well as an image input apparatus using this 4-line CCD sensor. This serves to realize proper gradation by easy adjustment or without any adjustment using a simple circuit configuration.

The above embodiments of the present invention provide a 4-line CCD sensor with its amplification factors set so that the amplitude of an output signal from the monochromic line sensor is larger than that of output signals from the color reading line sensors by a factor of integral power of 2, as well as an image input apparatus using this image input apparatus. This serves to provide a system with proper gradation accomplished by easy adjustment or without any adjustment using a simple circuit configuration.

Furthermore, the above embodiments of the present invention provide a 4-line CCD sensor with its amplification factors set so that the amplitude of an output signal from the monochromic line sensor is larger than that of output signals from the color reading line sensors by a factor of integral power of 2, as well as an image input apparatus using this image input apparatus. This enables an application-based system to be constructed using a simple circuit configuration, the system being such that high-speed color reading is executed for low gradation, whereas low-speed color reading is executed for high gradation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive-concept as defined by the appended claims and their equivalents.

What is claimed is:

1. A 4-line CCD sensor comprising:
a monochromic reading line sensor section composed of a monochromic photodiode array which receives incident light from a light source which has a white spectral characteristic, to carry out photoelectric conversion according to the quantity of the incident light, a monochromic shift gate which transfers charges from the monochromic photodiode array, a monochromic analog shift register which receives the charges from the monochromic shift gate to transfer an electric signal, and a monochromic amplifier which has an amplification factor set according to the spectral characteristic of the light source and amplifies the electric signal from the monochromic analog shift register with this amplification factor to output the amplified electric signal to an exterior; and
a color reading line sensor section composed of color photodiode arrays each of which receives incident light from the light source to carry out photoelectric conversion according to the quantity of the incident light, color shift gates each of which transfers charges from the color photodiode array, color analog shift registers each of which receives the charges from the color shift gate to transfer an electric signal, and color amplifiers each of which has an amplification factor set according to the spectral characteristic of the light source and amplifies an electric signal from the color analog shift register with this amplification factor to output the amplified electric signal to the exterior.

2. An image input apparatus comprising:
a light source having a white spectral characteristic;
a 4-line CCD sensor having a monochromic reading line sensor section composed of a monochromic photodiode array, a monochromic shift gate, a monochromic analog shift register, and a monochromic amplifier which has an amplification factor set according to the spectral characteristic of the light source and which amplifies an electric signal from the monochromic analog shift register with this amplification factor to output the amplified electric signal to an exterior, a color reading line sensor section composed of color photodiode arrays, color shift gates, color analog shift registers, and color amplifiers each of which has an amplification factor set according to the spectral characteristic of the light source and which amplifies an electric signal from the color analog shift register with this amplification factor to output the amplified electric signal to the exterior.

3. An image input apparatus according to claim 2, wherein the light source is a white xenon light source.

* * * * *